July 14, 1931.  J. S. GULLBORG  1,814,309
TRUCK
Filed Dec. 17, 1925    2 Sheets-Sheet 1
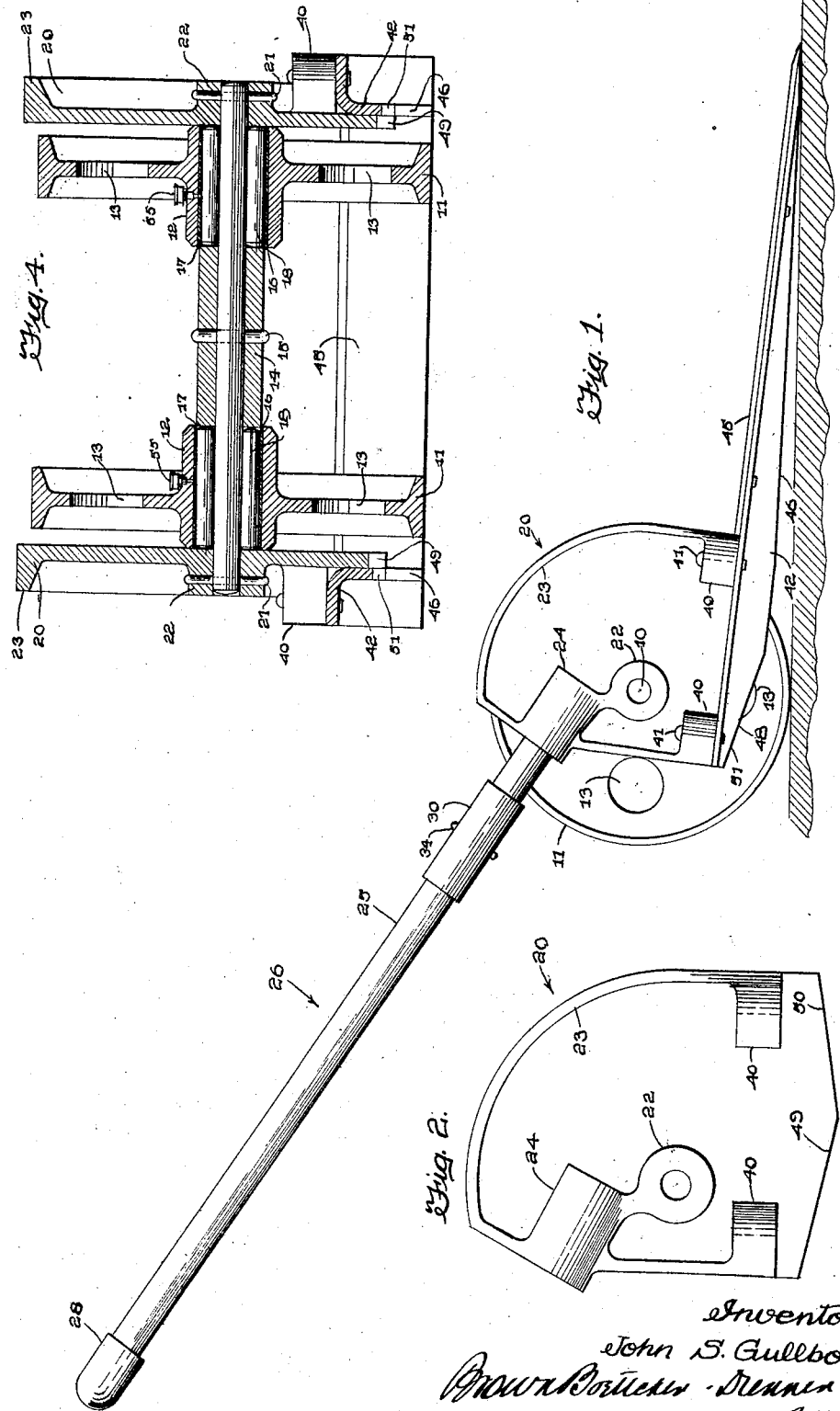
Inventor
John S. Gullborg
Brown Boettcher Dienner
Atty's July 14, 1931. J. S. GULLBORG 1,814,309
TRUCK
Filed Dec. 17, 1925 2 Sheets-Sheet 2
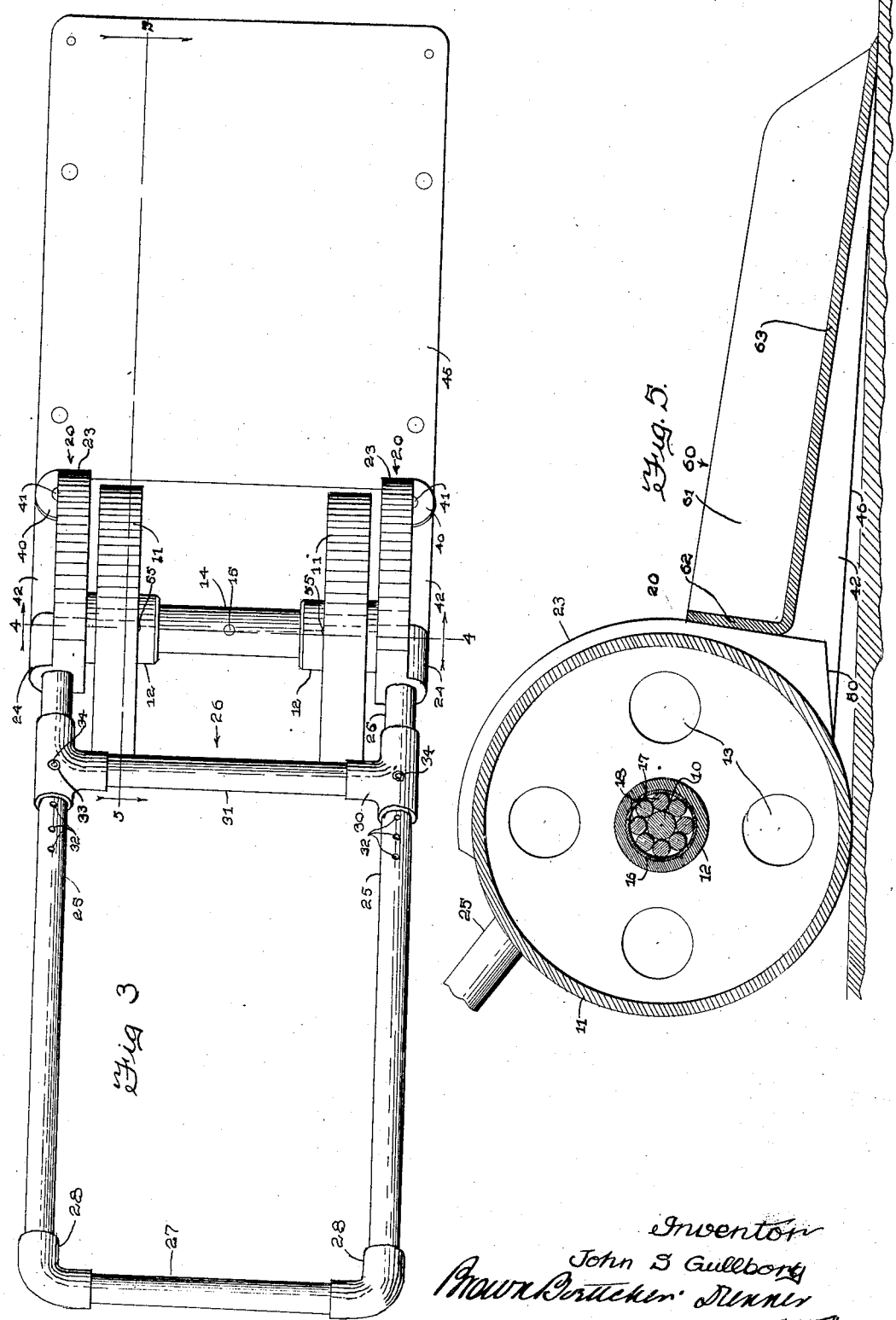

Patented July 14, 1931

1,814,309

UNITED STATES PATENT OFFICE

JOHN S. GULLBORG, OF CHICAGO, ILLINOIS, ASSIGNOR TO ALEMITE DIE CASTING & MFG. CO., OF WOODSTOCK, ILLINOIS, A CORPORATION OF ILLINOIS

TRUCK

Application filed December 17, 1925. Serial No. 75,919.

My invention relates to vehicles and more particularly to manually propelled trucks commonly referred to as "hand trucks" of the type having a foot support adapted to project beyond the supporting wheels.

Heretofore, the supporting member of hand trucks of this type has been made relatively small and, hence, is not capable of having the object to be carried entirely disposed thereon, especially if the object is a large one. The trucker in using such truck generally first tilted up the box or article, then pushed the supporting element under the box or other object to be conveyed with his foot, and then tilted the truck until the object rested against the relatively long handle-like construction thereof. Obviously, such an arrangement is not only cumbersome and inefficient, but requires an unnecessary expenditure of labor on the part of the trucker, especially in getting the object on the truck.

Now I propose to apply the principles of the ordinary scoop shovel to hand trucks. That is to say, I propose to make the supporting element relatively large, so as to enable it to be shoved under the object far enough to support the object to be conveyed. Also, I intend to slant the supporting element downwardly from the wheels to the ground at such a small angle that it may be thrust under the object or material without upsetting it or pushing it laterally. I have found that for ordinary usage this angle should be approximately 6 or 7 degrees. In other words, my truck may be likened to a comparatively large scoop shovel set at an angle to permit it to be pushed under an object and equipped with wheels for the dual purpose of raising the article from the ground and for enabling it to be manually propelled over the ground or floor with facility. It is evident therefore, that with such a truck, the trucker, by aligning the supporting member with the object to be conveyed and by pushing forward on the handle, can push the supporting member under the object without upsetting it or merely shoving it along, due to the relatively great length of the supporting member, and the character of the slanting surface thereof.

I also provide the relatively long supporting or carrying member of my novel hand truck with wedging means on its under surface for enabling it to be pushed with much greater facility under objects resting on curbs and other similar places slightly elevated from the ground or floor on which the wheels of the truck rest.

In the usual type of hand trucks, I also find that there is a tendency for the handle thereof to fall to the ground when the truck is not in use. In order to obviate this undesirable feature, I propose to provide counterbalancing means for at all times urging the handle into its upright position.

I propose to utilize the aforesaid counterbalancing means for preventing objects from coming into contact with the peripheries of the wheels. Also, I propose to employ the same means for protecting the wheels from side knocks, thereby enabling them to run true for a comparatively greater period of time than heretofore and to thus increase the useful life of the truck itself.

In order to maintain the number of parts of the truck at a minimum and to keep the weight of the truck at a minimum, I find it advisable to connect both the handle and the supporting platform of the truck directly to the counterbalancing means.

The object of the present invention is to provide an improved manually propelled truck of a minimum number of parts and of minimum weight, as well as of simple inexpensive and compact construction.

Other objects and advantages of the present invention will more fully appear from the following detailed description taken in connection with the accompanying drawings which illustrate one embodiment thereof, and in which:

Fig. 1 is a side elevation of my novel vehicle;

Fig. 2 is a detailed view illustrating one of my novel counterweights or supporting elements;

Fig. 3 is a plan view of the vehicle illustrated in Fig. 1;

Fig. 4 is a vertical sectional view taken on the line 4—4 of Fig. 3, looking in the direction indicated by the arrows; and Fig. 5 is a sectional view taken on the line 5—5 of Fig. 3 showing a slight modification of my invention.

Referring now to the drawings in detail, in which like reference numerals designate similar parts throughout the several views, 10 denotes a shaft or axle. This shaft or axle is a stationary one and is preferably made of cold rolled steel. Mounted on the shaft 10 are a pair of wheels 11, each of which has a relatively large hub portion 12. The wheels are provided with a plurality of perforations 13, preferably circular in contour, so as to decrease their weight. The wheels 11 are spaced from each other upon the axle or shaft 10 by a sleeve 14 disposed intermediate the hubs 12 of the two wheels. The sleeve 14 is secured to the middle of the axle 10 by a pin 15.

The hub 12 of each wheel 11 is provided with a bore 16 in which is fitted a cylindrical sleeve or bearing 17. Disposed intermediate the inner wall of the sleeve 17 and the axle 10 are a plurality of cold rolled steel rollers which I have designated by the reference numeral 18. These rollers constitute an anti-frictional support for the wheels.

Attached to each end of the shaft 10 is an element or bracket 20 which I shall hereinafter refer to as a counterweight. Since both of the elements are identical in construction, a description of one of them will suffice for both. By "identical", I mean that they are substantially alike in form. They are merely left and right patterns. Each of the weights 20 are secured to an end of the shaft by a pin 21.

In Fig. 2 I have illustrated in detail an elevation of my novel counterweight 20 which is capable of performing several novel functions, as will become more apparent with the progress of the present description. It should be noted that the weight 20 is provided with a hub portion 22 for accommodating the end of the shaft. Also formed on the upper edge of the counterweight is an arcuate shaped rib 23 which, when the vehicle is disposed in its normal position, is substantially parallel to the periphery of the adjacent wheel 11. It should also be noted that this arcuate shaped rib 23 is spaced a short distance from the periphery of the wheel and is adapted to prevent objects from contacting with the periphery of the wheel and to thereby interfere with its free movement. This feature will be more fully set out hereinafter.

Each counterweight 20 has formed thereon an apertured lug 24 for receiving one end of a leg 25 of my novel handle 26. The handle 26 (Fig. 3) comprises two such legs 25 joined at their free ends by a leg 27 through the medium of a pair of elbows 28. The other ends of the legs 25 are each mounted in the apertured lug 24 of the counterweight 20 and suitably attached thereto.

Also surrounding each leg, intermediate its end, is a T 30 which is loosely mounted thereon. The two T's 30 are connected by a common tube 31. Each leg is provided with a plurality of apertures 32 and each T is provided with an aperture 33 through which a pin may be inserted into an aperture 32 of the associated leg. It will thus be apparent that by removing the pins, which I have designated by the reference numeral 34, the cross bar or tube 31 may be moved into different positions and attached to the legs 25. This cross bar or tube 31 constitutes a foot rod for enabling the trucker to more easily lift his load, which will become more apparent hereinafter.

Each of the elements or counterweights 20 is also equipped with a pair of lateral lugs 40 formed integral therewith. The lugs 40 are disposed in alignment and are parallel to each other. Fastened to these lugs by rivets 41 is an angularly shaped member 42 (Figs. 1, 3 and 4). The member 42 is preferably bent into an angle of 90 degrees. It is, of course, to be understood that one of these members 42 is associated with each of the elements 20. The two right angle members 42 are disposed in parallel relationship and are adapted to have fastened thereto a supporting platform 45. This platform 45 may be riveted to the upper legs of the members 42. The vertical legs of the angular members 42 each have a tapered edge 46, which edges perform the function of wedging the platform 45 under an element to be lifted and conveyed. This feature will be described more fully in the operation of my novel truck.

It should be noted that the counterweights 20 move with the axle 10 secured thereto. In order to prevent the lower edge of each of the elements 20 from contacting with the floor, as well as an edge of the vertical legs of the angular members 42 from touching the floor, I preferably cut them away at an angle, as indicated at 48 in Fig. 1. That is to say, an edge 49 (Fig. 2) of each element 20 is tapered to a degree sufficient enough to permit it to clear the floor without interfering with the support afforded by the wheels 20. I also find it desirable to cut an edge 50 of each of the elements 20 with a similar taper. An edge 51 of each of the members 42 is tapered off in an opposite direction to the other relatively long taper thereof. The tapered edge 51 of each of the members 42 is adapted to align itself with the tapered edge 49 of the associated element 20, as is obvious in Fig. 1.

In order to properly lubricate the bearings and the axle of my truck, I provide a pair of grease cups 55, one for each wheel. These grease cups communicate directly with the bearings 18.

In Fig. 5 I have illustrated a modified form of supporting platform. I have designated this platform generally by the reference numeral 60. It comprises a scoop or trough-shaped member suitably attached to the longitudinal legs of the angularly shaped members 42. The trough-shaped member 60 may be riveted to the member 42 if it is so desired. This trough-shaped member serves as a scoop and enables the truck to be employed both as a vehicle for conveying material and as a device for scooping up the material. The scoop or trough-shaped member 60 is provided with a pair of tapered sides 61 connected in the rear by a back-piece 62, as well as a bottom 63.

The operation of my novel truck is as follows:—

Normally, when the truck is in disuse, the handle 26 will be moved upwardly by the pair of counterbalances 20 until the members 42 carrying the supporting elements 45 contact with the floor or the ground upon which the wheels 11 rest. When it is desired to move the truck, the attending trucker merely pulls down on the cross tubular member 27 to raise the supporting element 45 away from the ground. Then the truck may be propelled manually with facility over the ground to the place where the object to be moved is situated.

The supporting element 45 is then pushed under the object, causing the object to rest thereon. The trucker may use both the cross piece 27 and the cross member 31 of the handle 26 to push the truck bodily forward. That is to say, with his hands the trucker can exert force on the member 27 and with one of his feet he can exert force upon the cross member 31. The cross member 31 may be moved relative to the legs 25 of the handle to put it in a position more easily accessible to the trucker. That is to say, the position of the member 31 will depend upon the height of the trucker. It is evident that in the case of a tall man the cross member 31 may be moved to its most forward position due to the relatively great length of the tall man's legs. In the case of a short man, his leg reach is less and, hence, the cross member 31 would be moved to the opposite extreme position. The cross member 31 may also be used for exerting a downward pressure upon the handle 26. That is to say, in other words, by pressing on the cross bar 31 with his foot, the trucker is enabled to more easily raise the object on the supporting platform or element 45.

The tapered edges 46 of the angular members 42 serve as wedges and enable the platform 45 to be more easily moved under the object to be supported and carried. Once the object is on the supporting platform 45, the truck may be tilted until the object abuts the ribs 23 of the elements 20. These ribs serve to prevent the object from contacting with the peripheries of the wheels 11 and thus interfere with their free movement.

The previously mentioned tapered edges 46 of the angularly shaped members 42 which constitute wedges, are particularly useful where the object to be raised is resting on a curb or some other analogous place slightly elevated from the ground or floor on which the wheels of the truck rest. In other words, by slightly tilting the handle 26, the supporting element 45 may be raised to a position where it may be pushed under the object resting on the curb. The wedge-like surfaces of the members 42 facilitates the pushing of the supporting element 45 under the object. After the object is on the supporting platform, by still further tilting the handle 26 the object may be caused to be moved completely on the platform until it abuts the previously mentioned rib 23 of the elements 20.

The elements 20 being fastened to the axle 10 outside of the wheels 11, serve to prevent the sides of the wheels from being subjected to knocks and blows which most truck wheels are exposed to. For example, should the truck be moved up adjacent to a curb or other elevation, the counterbalances or elements 20 will take any knocks which may be imposed upon the truck in the vicinity of the wheels. This is a highly advantageous feature since it enables the wheels to run true for a comparatively greater period of time than theretofore, and to thus increase the longevity of the truck itself.

By fastening the handle 26 and the supporting platform 45 directly to the counterbalances or elements 20, the number of parts necessitated are minimized. This not only cheapens the manufacture of such vehicles or trucks, but also decreases their weight.

The roller bearings intermediate the wheels and the axle 10, serve not only to decrease the wear of the parts, namely, the wheels and axle, but also enable the wheels to move more freely and smoothly. Adequate lubrication is afforded to the bearings through the grease cups 55 which are readily accessible to the trucker.

Now, from the foregoing description, it is evident that the relatively long supporting platform or member of my novel truck is not only capable of supporting the entire object to be conveyed, but may be pushed with facility under the object due to its slanting top surface. The trucker, in using a truck having the features of my invention incorporated therein, does not have to expend as much labor as he did in the case of prior hand trucks, inasmuch as he can push the supporting element under the object with ease and in that he does not have to tilt the truck in order to cause the object to be completely disposed thereon. In reality, in prior trucks, the trucker was compelled to carry part of the weight of the object being carried. In my novel truck the amount of weight the trucker has to carry is reduced to a minimum. All the trucker does in the case of my truck, once the object is disposed thereon, is to push down on the handle to move the supporting element out of engagement with the floor or ground and then to push forward on the handle to propel the truck along the ground.

Therefore, it is apparent that my novel truck is somewhat analogous in construction to the well known scoop shovel. It is in reality a device having a slanting element or scoop equipped with a pair of wheels at its raised end and a handle for pivoting the element about the axis of the wheels and for enabling the manual propulsion of the device. By slanting the element or platform, it not only facilitates the shoving of the element under the object to be conveyed, but enables the pivoting of the platform about the axis of the wheels to move the platform clear of the ground.

In Fig. 5, as I have described previously, the supporting member is formed into a scoop, designated generally by the reference numeral 60. This scoop enables the truck to be used not only for conveying objects and articles, but for conveying materials, such as sand, stones, gravel and other analogous material. With the exception of the scoop feature, the vehicle illustrated in Fig. 5 is identical to the vehicle illustrated in the other figures.

Although I have illustrated and described in detail the preferred form of my invention, it is, of course, to be understood that the invention is not to be limited by this single disclosure, but only insofar as defined by the scope and spirit of the claims hereto attached.

I claim:—

1. In a vehicle of the class described, an axle, a pair of spaced wheels mounted thereon, a pair of counterweights mounted on the axle outside of the said wheels, one counterweight being associated with each of the said wheels, a handle for enabling the manual propulsion of the vehicle comprising two legs, one being connected to each of the said counterweights, a carrying platform connected to the counterweights for supporting the object to be conveyed, the said counterweights serving at all times to urge the handle upwardly and to urge the platform downwardly into engagement with the floor, a foot rod connecting the two legs of the handle, and means for adjusting the position of the said foot rod to meet the requirements of the trucker.

2. In a vehicle of the class described, an axle, a pair of wheels revolvably mounted on the said axle, a sleeve surrounding the central portion of the said axle and fastened thereto for spacing the said wheels, a pair of counterweights fastened to the axle outside of the said wheels for confining the wheels between them and the sleeve, one counterweight being secured to each end of the axle, a handle comprising a pair of legs connected to the said counterweights at their lower ends and at their upper ends to a cross leg, one leg of the said handle being connected to each of the said counterweights, a carrying platform, and a pair of angular shaped members for connecting the said platform to the said counterweights, the said counterweights serving to maintain the handle in its uppermost position and the carrying platform in engagement with the floor when the vehicle is in disuse.

3. In a vehicle of the class described, an axle, a pair of wheels revolvably mounted on the said axle, roller bearings between each wheel and the axle, a sleeve surrounding the central portion of said axle and fastened thereto for spacing the said wheels, a pair of counterweights fastened to the axle outside the said wheels, one counterweight being secured to each end of the axle, a handle comprising a pair of legs connected to the said counterweights at their lower ends and at their upper ends to a cross leg, one leg of the said handle being connected to each of the said counterweights, an adjustable foot rod connected to the said pair of legs of the handle, a carrying platform, a pair of angular shaped members for connecting the said platform to the said counterweights, the said counterweights serving to maintain the handle in its uppermost position, and the carrying platform in engagement with the floor when the vehicle is in disuse, each of the said counterweights having a substantially arcuate shaped edge disposed parallel with the peripheries of the said wheels for preventing the object being conveyed from contacting with the peripheries of the wheels, the said angular shaped members serving as wedges for enabling the platform to be pushed under the object to be carried with facility.

4. In a vehicle of the class described, an axle, a pair of wheels mounted on said axle, handle means connected to said axle for enabling the manual propulsion of the vehicle, a foot rod connected to said handle means disposed in a position adjacent said wheels where it can be readily engaged by the foot of the trucker for aiding in the tilting of the handle means about the axis of the axle, and means for enabling the adjustment of the position of the said foot rod to meet the physical requirements of the trucker.

5. In a vehicle of the class described, an axle, a pair of spaced wheels mounted on said axle, a pair of bracketlike members, said axle extending through openings in the brackets and supporting the same, a handle connected to said members, a flat topped platform associated with said members and means for connecting said platform to the members comprising a pair of spaced elements connected to the underside of said platform and extending forward of the axle, each of said elements being fastened to one of said bracket members.

6. In a vehicle of the class described, an axle, a pair of spaced wheels mounted on said axle, a pair of bracket-like members mounted on the axle, a handle connected to said members, a flat topped platform associated with said members and means for connecting said platform to the members comprising a pair of spaced elements connected to the underside of said platform and extending forward of the axle, said bracket members having a plurality of lugs, said elements comprising angle irons fastened to said lugs.

7. In a truck, a wheel mounted axle, a substantially flat planar platform structure mounted on said axle, a handle construction extending from the platform structure and including spaced leg members and a foot rod for swinging the platform about the axle, said foot rod connecting said leg members and being adjustably secured to the same for adjustment toward and away from the platform structure.

8. In a truck, a wheel mounted axle, brackets mounted on the axle, angle members secured to the brackets and extending forwardly therefrom, the horizontal arms of said members being disposed uppermost and the arms of the angle members tapering in width vertically toward the front of the truck, and a platform secured on the horizontal arms of said angle members.

In witness whereof, I hereunto subscribe my name this 15th day of December, 1925.

JOHN S. GULLBORG.